United States Patent [19]

Nagai et al.

[11] Patent Number: 4,559,216

[45] Date of Patent: Dec. 17, 1985

[54] METHOD FOR PURIFICATION OF SULFURIC ACID SOLUTION

[75] Inventors: Tadao Nagai, Hokkaido; Yoshiaki Echigo, Kyoto, both of Japan

[73] Assignee: Unitika Limited, Hyogo, Japan

[21] Appl. No.: 586,488

[22] Filed: Mar. 5, 1984

[30] Foreign Application Priority Data

Mar. 3, 1983 [JP] Japan .................................. 58-35111

[51] Int. Cl.$^4$ ...................... C01B 17/90; C01B 28/00; B01D 15/00; C02B 1/44
[52] U.S. Cl. ...................................... 423/531; 123/87; 123/139; 123/24; 204/DIG. 13; 210/688
[58] Field of Search .................. 423/522, 531, 24, 87, 423/139; 204/DIG. 13; 210/688

[56] References Cited

U.S. PATENT DOCUMENTS

| | | | |
|---|---|---|---|
| 3,001,854 | 9/1961 | Kenworthy | 423/531 |
| 3,306,702 | 2/1967 | Odland et al. | 423/531 |
| 3,540,860 | 11/1970 | Cochran | 210/688 |
| 4,002,564 | 1/1977 | Carbonel et al. | 210/688 |
| 4,046,688 | 9/1977 | Cunningham et al. | 210/688 |
| 4,210,530 | 7/1980 | Etzel et al. | 423/24 |
| 4,383,104 | 5/1983 | Sasaki et al. | 423/24 |
| 4,414,183 | 11/1983 | Sasaki et al. | 423/24 |
| 4,444,666 | 4/1984 | Sato | 210/688 |

FOREIGN PATENT DOCUMENTS

| | | | |
|---|---|---|---|
| 2029117 | 12/1970 | Fed. Rep. of Germany | 423/531 |
| 51-40396 | 5/1976 | Japan | 423/531 |
| 52-43796 | 6/1977 | Japan | 423/531 |

OTHER PUBLICATIONS

Waitz, Jr. Ion Exchange for Recovery of Precious Metals, Plating and Surface Finishing, Apr. 1982, pp. 56-59.

*Primary Examiner*—Gary P. Straub
*Attorney, Agent, or Firm*—Sughrue, Mion, Zinn, Macpeak & Seas

[57] ABSTRACT

A method for purification of a sulfuric acid solution such as, for example, a copper electrolyte which entrains at least one metal ion species selected from the group consisting of antimony ions, bismuth ions, and iron ions and having a sulfuric acid concentration of at least 50 g/liter is disclosed. The method comprises exposing the sulfuric acid solution to a chelating resin possessing aminomethylenephosphonic acid group as a chelate forming group thereby effecting adsorptive separation of the aforementioned at least one metal ion species from the solution. By the method described above, the antimony ions, bismuth ions, and/or iron ions contained as impurities in the copper electrolyte can be easily and efficiently separated out of the system without entailing any ecological problem.

15 Claims, No Drawings

METHOD FOR PURIFICATION OF SULFURIC ACID SOLUTION

FIELD OF THE INVENTION

This invention relates to a method for purification of a highly concentrated sulfuric acid solution, particularly a copper electrolyte, containing at least one metal ion species selected from the group consisting of antimony ion, bismuth ion, and iron ions (hereinafter referred to as "Sb, Bi, or Fe ion") by effecting selective adsorptive separation of the metal ion species from the solution by the use of a specific chelating resin.

BACKGROUND OF THE INVENTION

Generally in the electrolysis of copper, when the concentrations of impurities such as As, Sb, Bi, Ni or Fe in the electrolyte increase beyond certain levels, such impurities pass into the produced copper, and degrade its quality and electric power efficiency. To avoid this trouble, the practice of carrying out the electrolysis while keeping the concentrations of impurities in the electrolyte below fixed standard levels is widely observed. These standard levels vary from one refinery to another. For example, in regard to Sb, Bi or Fe, their levels are generally on the order of 0.2 to 0.5 g/liter for Sb, 0.1 to 0.3 g/liter for Bi, and 0.5 to 2 g/liter for Fe.

For the purpose of keeping the concentrations of impurities below the standard levels, the electrolyte is purified. At present, this purification of the electrolyte is generally effected by the method of purification liberator electrolysis. Since this method electrolytically collects such impurities by simultaneously effecting deposition of metals and liberation of hydrogen on the cathode, it suffers from very low electric power efficiency. Moreover, this method entails occurrence of arsine and, therefore, proves undesirable from the standpoint of the safety of the work environment. It also has a disadvantage that the metal deposit collected electrolytically as described above and containing Sb, Bi or Fe ions is further treated for recovery of copper therefrom, this method is destined to consume a very large amount of energy.

As another method for purification of the copper electrolyte, the so-called Bolidens Process (U.S. Pat. No. 3,753,877) has been reduced to practice. This method involves forced addition to the copper electrolyte of As ion which is detrimental to the electrolysis. Thus, it is not an advantageous method either economically or from the standpoint of the preservation of environment. The method for purification of the copper electrolyte by adsorptive removal of Sb and Bi ions by the use of β-stannic acid which is disclosed in the specification of U.S. Pat. No. 3,696,012, a so-called Norddeutshe Process, had also been reduced to practice. This method does not readily permit continuous adsorptive removal of impurities by passage of the solution through a column packed with the β-stannic acid as the adsorbent because this adsorbent is in a powdery form. It is not economical because part of the expensive β-stannic acid used as the adsorbent is dissolved in the copper electrolyte and thus a substantial amount is lost. It has another disadvantage that the adsorbent cannot be easily regenerated after it has adsorbed Sb, Bi, or other ions thereon. The method for purification of the copper electrolyte by extraction with a solvent has also been proposed (G.B. Pat. No. 2,515,862). This method has not yet been reduced to practice because the solvent pollutes the electrolyte and because the extraction is not effected with high efficiency.

Recently, chelating resins have been developed for practical use and various methods have been proposed for adsorptive removal of metal ions from solutions by use of such chelating resins. Ordinary, commercially available chelating resins, however, have no ability to provide adsorptive separation of Bi, Sb, or Fe ions from the aforementioned highly concentrated sulfuric acid solution having a sulfuric acid concentration of at least 50 g/liter. These resins have been inapplicable, therefore, to the purification of solutions containing sulfuric acid in high concentrations such as copper electrolytes.

In the specifications of U.S. Pat. Nos. 4,383,104 and 4,414,183, there are disclosed phenolic chelating resins possessing groups having methylenephosphonic acid group substitutes for part or all of the hydrogen atoms of the primary or secondary alkylamino groups introduced as chelate forming groups into phenol rings and use of such chelating resins for adsorptive separation of heavy metal ions, particularly uranyl ions.

SUMMARY OF THE INVENTION

An object of this invention is to provide a method for purification of a highly concentrated sulfuric acid solution such as, for example, a copper electrolyte, containing Sb, Bi or Fe ions as impurities, by a simple procedure incapable of entailing any ecological problem.

The inventors made a diligent study aimed at attaining the object described above. Consequently, it has been found that ready and efficient removal of Sb, Bi or Fe ions from the aforementioned sulfuric acid solution is accomplished by exposing the solution to a specific chelating resin. This invention has been achieved based on this knowledge.

Specifically, this invention relates to a method for purification of a sulfuric acid solution containing Sb, Bi or Fe ions and having a sulfuric acid concentration of at least 50 g/liter, which is characterized by effecting adsorptive separation of the Sb, Bi or Fe ions from the sulfuric acid solution by exposing the solution to a chelating resin which possesses a group having at least one methylenephosphonic acid group substituted for part or all of the hydrogen atoms of a primary or secondary amine group incorporated as a chelate forming group in the resin matrix.

By the method of this invention, the highly concentrated sulfuric acid solution containing Sb, Bi or Fe ions can be purified simply and efficiently. Thus, the present invention offers a solution to the problems entailed by the conventional methods.

DETAILED DESCRIPTION OF THE INVENTION

The chelating resin to be used for this invention is a chelating resin which possesses at least one aminomethylenephosphonic acid group acid group substituted for part or all of the hydrogen atoms of an alkylamine group incorporated as a chelate forming group in the resin matrix (hereinafter referred to as an "aminomethylenephosphonic acid group"). Typical examples of the aminomethylenephosphonic acid group include aminomethylenephosphonic acid, imino-bis(methylenephosphonic acid), etc.

Examples of resin matrices usable in the chelating resin contemplated by this invention include phenolic resins such as phenol-aldehyde resin, polystyrene resins such as of styrene-divinylbenzene copolymer, epoxy resin and polyvinyl chloride resin. Of these resin matrices, phenol resins and polystyrene resins have been found to be desirable, more preferably phenol resins. The phenolic chelating resin disclosed in the specification of Japanese Patent Publication (Unexamined) No. 13331/81 (U.S. Pat. Nos. 4,383,104 and 4,414,183) may be used. This resin can be produced by the following method. Formaldehyde and phosphorous acid are reacted, in the presence of a mineral acid, upon a phenol derivative containing a primary or secondary alkylamino group thereby having part or all of the protons of the amino group substituted for by methylenephosphonic acid and subsequently causing a reaction between the phenol and the aldehyde thereby inducing gelation. Examples of phenol derivatives containing a primary or secondary alkylamino group used in the method described above are tyrosine, ammonia resol, salicyl amine, etc., preferably ammonia resol. Examples of desirable mineral acids are hydrochloric acid and sulfuric acid, more preferably sulfuric acid. Examples of desirable phenols are phenol and resorcin, more preferably phenol. Examples of desirable aldehydes are formaldehyde and acetaldehyde, more preferably formaldehyde. In the present invention, the phenolic chelating resin is desirably used in a granular form. Optionally, it may be used in a fibrous form or plate-like form.

Particularly for this invention, the phenolic chelating resin which has imino-bis(methylenephosphonic acid) as a functional group and uses a phenol-formalin resin as a matrix (Unicellex ® UR-3300) proves desirable.

The sulfuric acid solution subjected to the treatment by the method of this invention is a solution which contains sulfuric acid in a concentration of at least 50 g/liter and entrains Sb, Bi or Fe ions. while this invention is capable of purifying the sulfuric acid solution of the foregoing description, it is also capable of purifying a solution which contains sulfuric acid in a concentration of at least 50 g/liter and entrains the aforementioned Sb, Bi or Fe ions in conjunction with one or more ion species selected from the group consisting of copper ions, nickel ions, and arsenic ions. As a typical example of the solution of this description, the copper electrolyte may be cited. This invention is capable of purifying the copper electrolyte through selective, adsorptive separation of the Sb, Bi and Fe ions from the solution.

Besides the copper electrolyte mentioned above, this invention provides desired purification to the mother liquor of copper sulfate crystals, the sulfuric acid solution obtained by dissolving an intermediate (mat, speiss, or electrodeposit) in the refining of a non-ferrous metal containing As, the waste sulfuric acid occurring in a sulfuric acid plant, and the raffinate resulting from the contact of copper electrolyte with an organic phase containing tributyl phosphate.

The method of the present invention can be carried out continuously or batchwise. It is more advantageous to carry out this method in a continuous operation. The continuous operation of this method is accomplished, for example, by filling a packing column or perforated-plate column with the phenolic chelating resin and passing the sulfuric acid solution containing Sb, Bi or Fe ions through the column at a flow rate of SV 0.5 to 20 l/hr, preferably SV 1 to 5 l/hr, with the temperature kept in the range of about 18° C. to 80° C. ("SV" refers to space velocity per hour ($hr^{-1}$)). In this operation, the sulfuric acid solution may be passed upward or downward through the column.

When a copper electrolyte containing free sulfuric acid in a concentration of 200 g/liter and entraining Sb ions in a concentration of 0.2 to 0.5 g/liter, Bi ions in a concentration of 0.1 to 0.3 g/liter, and Fe ions in a concentration of 0.5 to 2 g/liter is continuously passed through a column of the phenolic chelating resin in accordance with this invention, the amount of Sb, Bi or Fe ions adsorbed on the resin falls in the range of 4 to 10 g/liter of resin, 8 to 30 g/liter of resin, or 10 to 40 g/liter of resin, respectively. The amount adsorbed is variable with the specific Bi, Sb or Fe ions concentration in the original solution.

The Sb, Bi or Fe ions adsorbed on the chelating resin can be eluted with an aqueous solution of hydrochloric acid having a normality exceeding 1, desirably falling in the range of 2 to 8, and preferably in the range of 5.5 to 6.5. Particularly, the use of an aqueous solution of hydrochloric acid having a normality in the range of 5.5 to 6.5 enhances the ratio of elution of the Sb, Bi or Fe ions and permits efficient recovery of hydrochloric acid. The contact method between the eluant and the chelating resin may be effected either continuously by use of a column or batchwise by use of a vat. Continuous contact by use of a column is preferred over the batchwise contact. In the continuous contact by use of a column, the flow volume of the aqueous solution of hydrochloric acid is in the range of 1 to 5 liters/liter of resin, preferably 2 to 3 liters/liter of resin. During the elution, the temperature of the eluant is desired to fall in the range of 10° C. to 60° C., preferably in the range of 20° C. to 30° C. When the elution is carried out continuously by use of a column, the flow rate of the aqueous solution of hydrochloric acid is SV 0.5 to 5 l/hr, preferably SV 1 to 2 l/hr.

Particularly, when an aqueous solution of hydrochloric acid having a normality in the range of 5.5 to 6.5 is used as the eluant, distillation of industrial significance can be utilized for the recovery of hydrochloric acid from the hydrochloric acid eluate containing Sb, Bi or Fe ions. This distillation may be effected in the form of single-pass distillation or multi-stage distillation. It may be performed under normal pressure or under a vacuum. In this case, when the aqueous solution of hydrochloric acid has a normality of 6, the hydrochloric acid and water form an azeotrope. Thus, the distillation is desired to be carried out under azeotropic conditions. The aqueous solution of hydrochloric acid, therefore, can be recovered through single-pass distillation in yields of about 95 to 99% by volume optionally by adding water or 35% hydrochloric acid (12N hydrochloric acid) to the hydrochloric acid eluate.

In this invention, the distillation of the hydrochloric acid eluate efficiently proceeds when the eluate contains the Sb, Bi or Fe ions in a total metal concentration exceeding the level of 3 to 4 g/liter. The practice of setting aside those of the fractions of eluate from the chelating resin which have a total metal ion concentration not reaching the level of 3 to 4 g/liter, using such fractions in their undistilled form as eluant again for the chelating resin, and thereafter exposing them to distillation proves economical in the sense that the total volume of the eluate subjected to distillation can be decreased. As occasion demands, the whole eluate may be finely adjusted so that the eluate will contain hydrochloric acid in a concentration suitable for the formation of an azeotrope with water.

The aqueous solution of hydrochloric acid which is recovered by this distillation is an aqueous 6N hydrochloric acid solution of a composition capable of forming an azeotrope and, therefore, can be used in its unaltered form again as an eluant for the chelating resin. Since the recovered aqueous solution of hydrochloric acid contains substantially no Sb, Bi and Fe ions, it can be used highly efficiently for the elution of the metal ion adsorbed on the chelating resin.

Besides the distillation described above, the separation of hydrochloric acid and Sb, Bi or Fe ions from the eluate may be effected by the method which involves treatment using a strongly basic anion-exchange resin, the method which involves extraction using TBP as a solvent, and the method which treats the eluate with hydrogen sulfide or sodium sulfide to recover Bi or Sb ions in the form of a sulfide precipitate. The hydrochloric acid which has been recovered by any of these methods can be repetitively used as an eluant.

As described in detail above, this invention makes it possible for a highly concentrated aqueous solution of sulfuric acid entraining Sb, Bi or Fe ions to be easily and efficiently purified. This invention, therefore, offers a solution to the problems suffered by conventional methods.

The present invention will now be described more specifically below with reference to working examples. However, the scope of the invention is not limited to the examples.

EXAMPLE 1

Through a column packed with 3 liters of a chelating resin (Unicellex ® UR-3300 made by Unitika) containing imino-bis(methylenephosphonic acid) as a ligand, 135 liters of a copper electrolyte containing 40 g of copper ions per liter, 10 g of nickel ions per liter, 6 g of arsenic ions per liter, 0.4 g of antimony ions per liter, 0.3 g of bismuth ions per liter, and 0.5 g of iron ions per liter and also containing 200 g of free sulfuric acid per liter was passed at a flow rate of SV 5 l/hr at 60° C.

After the passage through the column, the electrolyte was found to contain 40 g of copper ions per liter, 10 g of nickel ions per liter, 6 g of arsenic ions per liter, 0.2 g of antimony ions per liter, 0.2 g of bismuth ions per liter, and 0.3 g of iron ions per liter, indicating that antimony ions, bismuth ions, and iron ions were selectively adsorbed on the chelating resin.

Then, the column was rinsed with water. Subsequently, 6 liters of an aqueous 6.2N hydrochloric acid solution was passed through the column at a flow rate of SV 2 l/hr at 25° C. to elute the metal ions adsorbed on the resin.

Consequently, there was obtained 6 liters of a 6.1N hydrochloric acid eluate containing 4.3 g of antimony per liter, 2.1 g of bismuth per liter, and 4.1 g of iron per liter.

The ratios of elution obtained in this case, therefore, were 96% by weight of antimony, 93% by weight of bismuth, and 91% by weight of iron.

When this eluate was subjected to single-pass distillation under normal pressure, there was recovered 2.95 liters of an aqueous hydrochloric acid solution as a distillate. This aqueous solution was found to contain hydrochloric acid in a concentration of 6.1N.

In the recovered aqueous hydrochloric acid solution, antimony was detected in a concentration of 30 mg/liter and no other metal ion was substantially discernible.

When the recovered aqueous hydrochloric acid solution was used again as an eluant for the UR-3300 column which had adsorbed therein antimony, bismuth, and iron, it efficiently eluted these metal ions from the column.

EXAMPLE 2

A column 27.5 cm in length was packed with 30 ml of a phenolic chelating resin (Unicellex ® UR-3300, made by Unitika). Through this column, 1.5 liters of a solution containing 35 g of copper per liter, 4.2 g of arsenic per liter, 0.21 g of antimony per liter, 0.40 g of bismuth per liter, 2.5 g of iron per liter, and 200 g of free sulfuric acid per liter was passed at a flow rate of SV 3 l/hr at 40° C. The solution which had passed the column was tested for copper, arsenic, antimony, bismuth and iron concentrations.

The metal ion concentrations thus found were 35 g of copper per liter, 4.2 g of arsenic per liter, 0.11 g of antimony per liter, 0.34 g of bismuth per liter, and 1.8 g of iron per liter, indicating that the resin was capable of selectively removing antimony, bismuth and iron by adsorption.

From these results, it is noted that the treatment purified the aforementioned solution.

Then the column was rinsed with water. Subsequently, 0.12 liter of an aqueous 4N hydrochloric acid solution was passed through the column at a flow rate of SV 1 l/hr to elute the antimony, bismuth, and iron ions adsorbed on the resin. When the eluate was assayed for antimony, bismuth, and iron concentrations, the metal ion concentrations were found to be 2.1 g of antimony per liter, 0.72 g of bismuth per liter, and 6.2 g of iron per liter, indicating that antimony and bismuth were recovered substantially quantitatively and iron was recovered in a yield of 75% by weight. The column which had been passed by the aqueous hydrochloric acid solution was rinsed with water. Subsequently, 15 liters of a solution containing 35 g of copper per liter, 4.2 g of arsenic per liter, 0.21 g of antimony per liter, 0.40 g of bismuth per liter, 2.5 g of iron per liter, and 200 g of free sulfuric acid per liter was passed through the column at a flow rate of SV 3 l/hr at 40° C. When the effluent from the column was assayed for copper, arsenic, antimony, bismuth, and iron concentrations, the metal ion concentrations were substantially identical with those of the effluent in the first treatment. The results clearly indicate that the resin can be used repeatedly.

Separately, 0.12 liter of the hydrochloric acid eluate containing bismuth, antimony, and iron was combined with 0.12 liter of TBP, stirred at 30° for 20 minutes, and then allowed to separate into a water phase and a TBP phase.

When the water was assayed for bismuth, antimony, and iron concentrations, it was found to contain 0.06 g of antimony per liter, 0.09 of bismuth per liter, and 0.7 g of iron per liter, indicating that the hydrochloric acid could be regenerated by extraction with TBP.

EXAMPLE 3

A column 27.5 cm in length was packed with 30 ml of a phenolic chelating resin (Unicellex ® UR-3300, made by Unitika). Through this column, 1.5 liters of a solution containing 32 g of copper per liter, 10 g of nickel per liter, 4.0 g of arsenic per liter, 0.24 g of antimony per liter, 0.41 g bismuth per liter, and 200 g of free sulfuric acid per liter was passed at a flow rate of SV 3 l/hr at 40° C. The effluent from the column was assayed to determine its metal ion concentration.

Consequently, the metal ion concentrations were found to be 32 g of copper per liter, 10 g of nickel per liter, 4.0 g of arsenic per liter, 0.05 g of antimony per liter, and 0.25 g of bismuth per liter, indicating that the resin selectively separated antimony and bismuth by adsorption.

The results clearly indicate that the treatment purified the aforementioned solution.

COMPARATIVE EXAMPLE 1

Columns were packed with 30 cc each of a commercially available iminodiacetic acid type chelating resin using a phenol-formalin type matrix (Unicellex® UR-50, made by Unitika), a styrenic resin (Amberlite® IRC-718, made by Rohm and Haas), and a styrenic resin (Dowex A-1, made by Dow Chemical). Through each of the columns, 1.5 liters of the same sulfuric acid solution as used in Example 2 was passed.

When the effluents were assayed for antimony and bismuth, the metal ion concentrations were the same as those in the original solution, indicating that the resins thus used adsorbed absolutely no bismuth or antimony.

While the invention has been described in detail and with reference to specific embodiments thereof, it will be apparent to one skilled in the art that various changes and modifications can be made therein without departing from the spirit and scope thereof.

What is claimed is:

1. A method for purification of a sulfuric acid solution entraining a metal ion species selected from the group consisting of antimony ions, bismuth ions, or at least two metal ion species selected from the group consisting of antimony ions, bismuth ions and iron ions, and containing at least 50 g of sulfuric acid per liter, comprising:

exposing the sulfuric acid solution to a chelating resin possessing a group having methylene-phosphonic acid group substituted for a hydrogen atom or a primary or secondary alkylamino group incorporated as a chelate forming group into a resin matrix to effect adsorption on the chelating resin; and allowing the chelating resin to separate the metal ion species adsorbed on the chelating resin from the sulfuric acid solution, wherein the metal ion species separated by adsorption on the chelating resin is a metal ion species selected from the group consisting of antimony ions, bismuth ions or at least two metal ion species selected from the group consisting of antimony ions, bismuth ions and iron ions.

2. A method as claimed in claim 1, wherein the chelating resin is a phenolic chelating resin which possesses a group having a methylenephosphonic acid group substituted for a hydrogen atom of a primary or secondary alkylamino group incorporated as a chelate forming group in the phenol ring.

3. A method as claimed in claim 1, wherein the sulfuric acid solution further entrains a species selected from the group consisting of copper ions, nickel ions, and arsenic ions.

4. A method as claimed in claim 1, wherein the sulfuric acid solution is a copper electrolyte.

5. A method as claimed in claim 1, wherein the metal ion species selected from the group consisting of antimony ions, bismuth ions, or at least two metal ion species selected from the group consisting of antimony ions, bismuth ions and iron ions, and adsorbed on the chelating resin is eluted with an aqueous hydrochloric acid solution having a normality of at least 1.

6. A method as claimed in claim 5, wherein the aqueous hydrochloric acid solution has a normality in the range of 5.5 to 6.5.

7. A method as claimed in claim 1, wherein the sulfuric acid solution contains antimony ions, bismuth ions and iron ions.

8. A method as claimed in claim 1, wherein the chelating resin possesses a group having a plurality of methylenephosphonic acid groups substituted for hydrogen atoms of a primary or secondary alkylamino group incorporated as a chelate forming group into a resin matrix.

9. A method as claimed in claim 8, wherein the chelating resin possesses a group having methylenephosphonic acid groups substituted for all of the hydrogen atoms of a primary or secondary alkylamino group incorporated as a chelate forming group into a resin matrix.

10. A method as claimed in claim 1, wherein the chelating resin is a phenolic chelating resin which has an imino-bis(methylenephosphonic acid) as a functional group and uses a phenol-formalin resin as a matrix.

11. A method as claimed in claim 1, wherein the chelating resin is present in a column and the sulfuric acid solution is passed through the column and exposed to the chelating resin at a rate in the range of SV 0.5 to 20 hr$^{-1}$.

12. A method as claimed in claim 11, wherein the sulfuric acid solution is contacted with the chelating resin at a rate in the range of SV 1 to 5 hr$^{-1}$ while maintaining a temperature in the range of 18° C. to 80° C.

13. A method as claimed in claim 1, wherein the sulfuric acid solution entrains antimony ions.

14. A method as claimed in claim 1, wherein the sulfuric acid solution entrains bismuth ions.

15. A method as claimed in claim 1, wherein the sulfuric acid solution entrains antimony ions and bismuth ions.

* * * * *